US005709731A

United States Patent [19]
Armstrong

[11] Patent Number: 5,709,731
[45] Date of Patent: Jan. 20, 1998

[54] SLURRY PIPELINE LEACHING METHOD

[75] Inventor: William P. Armstrong, North Vancouver, Canada

[73] Assignee: Cominco Ltd., Vancouver, Canada

[21] Appl. No.: 676,853

[22] Filed: Jul. 8, 1996

Related U.S. Application Data

[63] Continuation of Ser. No. 297,743, Aug. 30, 1994, abandoned.

[30] Foreign Application Priority Data

Sep. 3, 1993 [CL] Chile ................................ 1075/93

[51] Int. Cl.$^6$ .................................................. C22B 3/04
[52] U.S. Cl. ........................ 75/712; 75/739; 75/740; 75/743; 299/5
[58] Field of Search ...................... 75/712, 739, 740, 75/743; 299/5, 7

[56] References Cited

U.S. PATENT DOCUMENTS

| 3,868,439 | 2/1975 | Wadsworth | 299/5 |
| 4,367,210 | 1/1983 | Dunham, Jr. | 423/497 |
| 4,416,567 | 11/1983 | Elmore et al. | 406/63 |
| 4,606,764 | 8/1986 | Hazen et al. | 75/740 |
| 5,310,413 | 5/1994 | Hallinan | 75/744 |
| 5,356,457 | 10/1994 | Pincheira Alvarez et al. | 75/712 |

FOREIGN PATENT DOCUMENTS

| 947796 | 5/1974 | Canada . |
| 1324879 | 9/1989 | Canada . |
| 2070722 | 6/1992 | Canada . |

OTHER PUBLICATIONS

Bell, R.W. et al "Thirteen Years of Operating Experience With the World's First Long–Distance Iron Ore Slurry Pipeline", published Mar., 1981 by Slurry Transport Association, Washington, D.C.

Postlethwaite, J. "The Control of Erosion–corrosion in Slurry Pipeline", published Dec., 1987 by: National Assoc. of Corrosion Engineers, Houston Texas.

Faddick, R.R., "Slurry Pipelines—An Overview", published Jan., 1983 by American Society of Civil Engineers, Journal of the Boston Society of Civil Engineers Section.

Bougainville's Copper Slurry Pipeline, published Mar. 1973 by Mining Journal vol. 280, p. 177.

*Primary Examiner*—George Wyszomierski
*Attorney, Agent, or Firm*—Arne I. Fors

[57] ABSTRACT

A method for concurrently transporting and leaching metal values from an ore or concentrate containing said metal values from an originating site such as an elevated site to a delivery site comprising the steps of crushing and/or grinding the ore or concentrate to form a particulate having a size range suitable for transport by gravity or a combination of pumping and gravity as a solid constituent in an aqueous slurry, forming an aqueous slurry of from about 30 to about 70 percent by weight of said particulate in an aqueous medium, and adjusting said aqueous slurry to contain an effective amount of a lixiviant for dissolution of said metal values into the aqueous medium. The aqueous slurry with lixiviant is transported in an elongated pipeline under a static pressure and for a residence time sufficient for dissolution of a substantial portion of the metal values, and the aqueous medium with the metal values is separated from the solids constituent of the slurry by a hydrocone, settling tank, thickener, lagoon, pond or heap, or counter-current decantation or washing circuit for recovery of values therefrom. The ore or concentrate may contain metal oxides, metal sulphides, native metal or a combination thereof, such as for example, a copper oxide concentrate or an ore, and the lixiviant may be sulphuric acid.

14 Claims, No Drawings

SLURRY PIPELINE LEACHING METHOD

This application is a Continuation of Application Ser. No. 08/297,743 filed Aug. 30, 1994 (now abandoned).

This invention relates to the transportation of metal ores and concentrates by pipeline and, more particularly, relates to concurrently transporting and leaching metal values from an ore or concentrate containing metal values in an elongated pipeline from an originating site to a delivery site.

It is known to transport coal, tailings, oil sands and shale, and the like material in particulate form in a water slurry in a pipeline. U.S. Pat. No. 4,416,567 issued Nov. 22, 1983 discloses a method and apparatus for transporting coal from an elevated supply site to a delivery site at a substantial elevation below the supply site in which the coal is separated from the slurry at the delivery site and clarified water from the slurry recycled to the supply site. Advantage is taken of the static pressure of the water at the low elevation of the delivery site to reduce pump head requirements to recycle the water to the elevated supply site.

Canadian Patent No. 947796 issued May 21, 1974 discloses a method of pipelining iron ore in an aqueous slurry of the iron ore containing a dispersant and a friction-reducing agent to facilitate moving of the slurry through the pipeline.

Published Canadian Patent Application No. 2,070,722 published Dec. 7, 1992 discloses a process for the extraction of metal values from metal bearing ores in a slurry containing a lixiviant whereby a gaseous agent is dissolved in the lixiviant in a slurry pipeline connecting various stages of processing equipment in a plant such as hydrocone separators and thickeners in a leaching stage. The ore treated is a gold ore and the process includes a carbon-in-pulp absorption section for contact of the leached slurry with activated carbon to absorb the gold from the lixiviant.

It is a principal object of the present invention to provide a method of concurrently transporting and leaching metal values from an ore or concentrate containing said metal values from an originating site, such as an elevated site, to a delivery site whereby the ore or concentrate is substantially leached of metal values at the time of arrival at the delivery site.

It is another object of the present invention to provide a method of leaching metal values from an ore or concentrate containing said metal values during the lengthy residence time of the aqueous slurry in a long distance pipeline.

In its broad aspect, the method of the present invention for concurrently transporting and leaching metal values from an ore or concentrate containing said metal values from an originating site such as an elevated site to a delivery site comprises the steps of crushing and/or grinding the ore or concentrate to form a particulate having a size range suitable for transport by gravity or a combination of pumping and gravity as a solid constituent in an aqueous slurry, forming an aqueous slurry of from about 30 to about 70 percent by weight of said particulate in an aqueous medium, adjusting said aqueous slurry to contain an effective amount of a lixiviant for dissolution of said metal values into the aqueous medium, transporting said aqueous slurry with lixiviant in an elongated pipeline under a static pressure and for a residence time sufficient for dissolution of a substantial portion of the metal values, and separating the aqueous medium with the metal values from the solids constituent of the slurry for recovery of values therefrom.

The ore or concentrate may contain metal oxides, metal sulphides, native metal or a combination thereof, such as for example, a copper oxide concentrate or an ore, and the lixiviant may be sulphuric acid. For a copper oxide concentrate or ore and a sulphuric acid lixiviant in an aqueous medium, the pH of the aqueous medium would be less than 5 during transport of the slurry in the pipeline from the originating site to the delivery site. It will be understood that the pH of the aqueous medium will be determined by the characteristics of the lixiviant for a particular ore or concentrate. It will also be understood that the pH may change during transport, due to consumption of the lixiviant.

The aqueous slurry is treated at the delivery site for separation of the aqueous medium with lixiviant and dissolved metal values from the solids in a hydrocone, settling tank, thickener, lagoon, pond or heap, or counter-current decantation or washing circuit. It may be preferred to recycle the aqueous medium after treatment for recovery of dissolved metal values and re-use of lixiviant.

The method of the invention will now be described with reference to a typical installation in which a mixing tank at an originating site, preferably an elevated supply site, receives ore or concentrate which has been crushed, ground, or crushed and ground in a processing site to a particle size typically in the range of −10 to less than −325 mesh Tyler series suitable for transport in a slurry. Water may be added in the grinding stage and additional water and a reagent are added to the mixing tank to form an aqueous medium capable of dissolving metal values contained in the particulate ore or concentrate. It will be understood that coarse particulate materials can be fed, such as by gravity, to a pipeline at an elevated location and the coarse material reduced in particle size due to agitation and attrition during passage through the pipeline to the destination. It will also be understood that the coarseness of the material may vary and the material may be very coarse, i.e. coarser than 10 mesh, for a large diameter pipe, the maximum particle size of the coarse material being limited by the ability of the slurry to carry the coarse material during transport in the pipeline.

A slurry of the particulate solids and the aqueous medium having a composition of from about 30 to about 703 by weight of the particulate in the aqueous medium is formed in the mixing tank and transported by pumping, by gravity, or by a combination thereof, through an elongated pipeline to a delivery site which may be many kilometers from the originating site. The distance between the originating site and the delivery site must be sufficiently long relative to the pipe capacity, determined by the pipe diameter, that the residence time of the slurry in the pipeline will be sufficient at the rate of flow in the pipeline for leaching of a substantial quantity of the metal values from the ore or concentrate into the aqueous medium.

The pipeline may be lined with a plastic coating to reduce abrasive wear of the crushed and ground ore or concentrate, which normally has an erosive sub-angular shape, and to minimize corrosion due to the presence of the lixiviant and possibly due to the presence of oxygen. The particles will self-abrade due to friction and will be reduced in size and rounded in shape during passage through the pipeline in the aqueous slurry under normal flow conditions.

The energy imparted to the transport system by gravity and/or pumping provides mixing and heating of the slurry and attrition of the particulate material to enhance dissolution of metal values. This is of particular significance for slow reacting ores and concentrates.

In order to maintain optimum leaching conditions during the residence time of the slurry in the pipeline along the length of the pipeline, it may be necessary to add lixiviant at spaced intervals along the pipeline. It may be preferable, such as for a copper oxide ore or concentrate, for which sulphuric acid is the lixiviant, to add sulphuric acid at the spaced intervals along the length of the pipeline to establish a desired optimum pH to enhance leaching of the metal values.

An oxidizing gas such as air or oxygen can be injected under pressure into the pipeline as required along its length if it is desired to complete oxidation of residual metal sulphides to oxides.

Upon arrival at the delivery site, a liquid-solid separator such as a hydrocone, or a settling tank or a thickener, or a counter-current decantation or washing circuit, may be used to separate the aqueous medium with values from the solids. Alternatively, the slurry may be deposited in a pond or in heaps for heap leaching and the aqueous medium with metal values recovered.

The aqueous medium with dissolved values is treated for recovery of the metal values, by conventional processing, and the aqueous medium with lixiviant may be recycled to the originating site to provide a closed loop system with conservation of the aqueous medium and lixiviant for re-use.

The process of the invention will now be illustrated with reference to the following non-limitative examples.

EXAMPLE 1

This example summarizes the results of standard "rolling bottle" tests in which an oxidized copper ore crushed to various sizes was subjected to conditions simulating gentle agitation in a pipeline. A portion of the −10 mesh material was ground in a rod mill for specified periods of time and also subjected to the test procedure. The rolling bottle having a volume of 4 L was rotated at 50 rpm for 24 hours with a final temperature of 25° C. A 50% by weight slurry (approximately 1 kg solids per L solution) of oxidized copper ore having 0.65% by weight copper in an aqueous solution of sulphuric acid was agitated for the 24 hours for each size as indicated in Table 1. The liquid and solids were separated and the solids washed prior to analysis.

TABLE 1

| Sizing | Initial Acidity (g/L) $H_2SO_4$ | Final Acidity (g/L) $H_2SO_4$ | Initial Solids Total (g) | Initial Solids Copper (g) | Final Solids Total (g) | Final Solids Copper (%) | Final Solids Copper (g) | Extraction* (%) |
|---|---|---|---|---|---|---|---|---|
| −4# mesh | 40.5 | 2.1 | 1230 | 8.00 | 1151 | 0.20 | 2.30 | 68 |
| −10# mesh | 40.5 | 18.5 | 1017 | 6.61 | 942 | 0.23 | 2.17 | 64 |
| 5 min grind | 40.5 | 16.5 | 1060 | 6.89 | 928 | 0.20 | 1.86 | 70 |
| 10 min grind | 40.5 | 16.8 | 1086 | 7.06 | 1000 | 0.17 | 1.70 | 74 |
| 15 min grind | 40.5 | 15.3 | 1021 | 6.64 | 931 | 0.18 | 1.68 | 72 |
| 30 min grind | 40.5 | 15.3 | 1120 | 7.28 | 1010 | 0.18 | 1.82 | 73 |
| 1 min grind | 27.4 | 9 | 1181 | 7.68 | 1095 | 0.18 | 1.97 | 72 |
| 2 min grind | 27.4 | 8.5 | 1090 | 7.09 | 985 | 0.22 | 2.17 | 66 |
| −14# mesh | 24.9 | 8.6 | 1135 | 7.38 | 1051 | 0.19 | 2.00 | 70 |
| −14# mesh | 20 | 4.8 | 1074 | 6.98 | 966 | 0.21 | 2.03 | 68 |
| −14# mesh | 15 | 2.3 | 1115 | 7.25 | 1042 | 0.25 | 2.61 | 60 |

*extractions corrected for sampling during test

As seen from the results of Table 1, after 24 hours, typical extractions ranged from 60% to 74% and residue copper analyses ranged from 0.17% to 0.25% copper by weight. The results are useful for comparison purposes with the leach carried out in a pipeline described in Example 3.

EXAMPLE 2

This example summarizes the results of agitation tests in a beaker, illustrating the effect of typical parameters. An oxidized copper ore was crushed to −14 mesh and leached under different agitation conditions.

A 50% by weight solids slurry (approximately 2 kg solids per 2 L solution) of oxidized copper ore having 0.65% by weight copper was agitated in a 3 L beaker for 24 hours by an A310 LIGHTNIN™ hydrofoil impeller having a 6.4 cm diameter. The liquid and solids were separated and the solids washed prior to analysis.

TABLE 2

| Sizing | RPM | Initial Acidity (g/L) $H_2SO_4$ | Final Acidity (g/L) $H_2SO_4$ | Initial Solids Total (g) | Initial Solids Copper (g) | Final Solids Total (g) | Final Solids Copper (%) | Final Solids Copper (g) | Extraction* (%) |
|---|---|---|---|---|---|---|---|---|---|
| −14# mesh | 1000 | 26.2 | 7.5 | 2150 | 13.98 | 1974 | 0.17 | 3.36 | 74 |
| −14# mesh | 1270 | 24.9 | 6.8 | 2306 | 14.99 | 2133 | 0.18 | 3.84 | 72 |
| −14# mesh | 1600 | 25.2 | 3.2 | 2201 | 14.31 | 1980 | 0.18 | 3.56 | 73 |

*extraction corrected for sampling during test

As seen from the above results of Table 2, after 24 hours, extractions ranged from 72% to 74%, indicating no effect by increased levels of agitation for this system. Residue copper analyses ranged from 0.17% to 0.18% copper by weight. The results are useful for comparison purposes to the leach carried out in the pipeline in Example 3.

EXAMPLE 3

An experimental pipeline system, with a pump for circulation, was set-up in order to demonstrate the slurry pipeline leaching method. The pipeline comprised 180 meters of ¾ inch I.D. black PVC pipe in a closed loop system in series with a centrifugal pump having a capacity of 40 L/min. The initial slurry comprised 44 kg of oxidized copper ore having 0.6% by weight copper in 50 L of water. The feed was −14 mesh material. The pH of the slurry was maintained at between 1.5 and 2.0 by additions of sulphuric acid. The slurry temperature initially was 26° C. rising to 46° C. with a final temperature of 30° C. The results of the leach extraction over a time period of 15 hours are shown in Table 3.

TABLE 3

| Time (h) | Solids Copper Concentration (%) | Extraction (%) |
| --- | --- | --- |
| 0 | 0.6 | 0 |
| 1 | 0.33 | 45 |
| 2 | 0.29 | 52 |
| 4 | 0.23 | 62 |
| 7 | 0.21 | 65 |
| 15 | 0.20 | 67 |

After transportation and leaching in a pipeline for 15 hours, a final solids residual copper concentration of 0.20% and an extraction of 67% were achieved. These results are essentially comparable to those achieved in Examples 1 and 2 (rolling bottle and agitated beaker tests, respectively).

It will be understood that attrition of the particles in the pipeline and in the pumping system will vary with the design and operating conditions, with results varying according to different conditions. With reference to Example 3, for example, considerable attrition resulted due to repeated circulation of the slurry through the experimental pumping and piping arrangement.

The present invention provides a number of important advantages. A slurry of a particulate ore or concentrate can be concurrently transported and effectively leached in a long pipeline from a mining or milling site to a destination site. The energy made available by a descent from an elevated originating site to a delivery site provides self-attrition of the particles for size reduction, agitation, and heating of the slurry to enhance leaching of metal values. The agitation of the ore or concentrate particles in an aqueous solution of a lixiviant during a long residence time during transport allows leaching of metal values into the aqueous solution even though reaction rates may be slow. The aqueous solution containing values can be conveniently separated from the solids at the destination site, treated for recovery of contained values, and recycled if desired.

It will be understood that modifications can be made in the embodiment of the invention illustrated and described herein without departing from the scope and purview of the invention as defined by the appended claims.

I claim:

1. A method of concurrently transporting and leaching metal values from an ore or concentrate containing said metal values in a pipeline from an originating site to a delivery site which comprises the steps of:

crushing, grinding, or crushing and grinding the ore or concentrate to form a particulate having a size range suitable for pumping as a solid constituent in an aqueous slurry;

forming an aqueous slurry of from about 30 to about 70 percent by weight of said particulate in an aqueous medium;

adjusting said aqueous slurry to contain an effective amount of lixiviant for dissolution of said metal values into the aqueous medium;

transporting said aqueous slurry with lixiviant by pumping, gravity, or combination thereof, in an elongated pipeline under a static pressure and for a residence time sufficient for dissolution of a substantial portion of the metal values in the pipeline during transportation within the pipeline;

and separating the aqueous medium with the dissolved metal values from the solids constituent of the slurry thereby recovering said metal values at an extraction of at least about 60% from said ore.

2. A method as claimed in claim 1 in which the ore or concentrate contains metal oxides, metal sulphides, native metal or combination thereof.

3. A method as claimed in claim 2 in which the ore or concentrate contains copper oxide, the lixiviant is sulphuric acid, and in which an effective pH for dissolution of metal values is maintained in the aqueous medium during transport of the aqueous slurry in the pipeline from the originating site to the delivery site.

4. A method as claimed in claim 3, in which the originating site is an elevated site relative to the delivery site.

5. A method as claimed in claim 4 in which the ore or concentrate is crushed and ground to a size in the range of minus 10 mesh (1.65 mm) to less than 325 mesh, Tyler series (0.045 mm).

6. A method as claimed in claim 5 in which the aqueous medium with lixiviant and dissolved metal values is separated from the slurry at a destination site by means of a hydrocone, settling tank, thickener, lagoon, pond or heap.

7. A method as claimed in claim 4 in which the aqueous medium with lixiviant and dissolved metal values is separated from the slurry at a destination site by means of a hydrocone, settling tank, thickener, lagoon, pond or heap.

8. A method as claimed in claim 7 in which the separated aqueous medium with lixiviant and dissolved metal values is treated for recovery of the metal values and is recycled to the originating site.

9. A method as claimed in claim 4 in which energy is imparted to the slurry for mixing and heating of the slurry and attrition of the particulate ore or concentrate to enhance dissolution of metal values.

10. A method as claimed in claim 4 in which said size is in a range such that said particulate is capable of being carried through the pipeline by the slurry during said transporting step.

11. A method as claimed in claim 10 in which the aqueous medium with lixiviant and dissolved metal values is separated from the slurry at a destination site by means of a hydrocone, settling tank, thickener, lagoon, pond or heap.

12. A method as claimed in claim 3 in which the slurry is transported under flow conditions for reduction of particle size of the ore or concentrate by attrition during transport in the pipeline.

13. A method as claimed in claim 3 in which energy is imparted to the slurry for mixing and heating of the slurry and attrition of the particulate ore or concentrate to enhance dissolution of metal values.

14. A method as claimed in claim 13 in which energy is imparted to the slurry for mixing and heating of the slurry and attrition of the particulate ore or concentrate to enhance dissolution of metal values.

* * * * *